United States Patent [19]

Bertin et al.

[11] Patent Number: 4,995,488

[45] Date of Patent: Feb. 26, 1991

[54] CONTROL DEVICE FOR A COUPLING MEANS SUCH AS A CLUTCH

[75] Inventors: Patrice Bertin, Mery-Sur-Oise; Yvon Sévénnec, Vernouillet, both of France

[73] Assignee: Valeo, Paris, France

[21] Appl. No.: 464,928

[22] Filed: Jan. 16, 1990

[30] Foreign Application Priority Data

Jan. 18, 1989 [FR] France .................. 89 00534

[51] Int. Cl.⁵ .................. F16D 23/12; F16D 49/16
[52] U.S. Cl. .......................... 192/1.1; 192/7; 192/90; 188/83; 310/77; 318/372
[58] Field of Search ............... 192/0.02 R, 1.1, 1.36, 192/1.37, 7, 8 R, 84 R, 90; 188/83; 318/372; 310/77

[56] References Cited

U.S. PATENT DOCUMENTS

| | | | |
|---|---|---|---|
| 2,639,199 | 5/1953 | Patrosio | 188/83 X |
| 3,873,066 | 3/1975 | Opyrchal | 188/83 X |
| 4,641,855 | 3/1987 | Grunberg | 192/90 X |
| 4,645,137 | 2/1987 | Young | 188/83 X |
| 4,650,056 | 3/1987 | Sevennec et al. | 192/90 |
| 4,671,400 | 6/1987 | Grunberg et al. | 192/84 R X |
| 4,744,450 | 5/1988 | Bertin et al. | 192/84 R X |
| 4,750,596 | 6/1988 | Grunberg et al. | 192/7 |
| 4,828,093 | 5/1989 | Bertin et al. | 192/90 |
| 4,829,221 | 5/1989 | Grunberg et al. | 192/90 X |
| 4,878,396 | 11/1989 | Grunberg | 192/90 X |
| 4,890,711 | 1/1990 | Carmillet et al. | 192/90 X |

FOREIGN PATENT DOCUMENTS 2588629 4/1987 France .
2610262 8/1988 France .

Primary Examiner—Richard Lorence
Attorney, Agent, or Firm—Charles E. Brown; Charles A. Brown

[57] ABSTRACT

A servo control device comprises a motor and continuously acting friction device, which is coupled to the output shaft of the motor and arranged in a housing having an aperture through which the motor output shaft extends. The housing is mounted so as to float radially in a mounting which is provided for it in a casing. Resilient tongues are provided so as to act between the housing and the mounting. The invention is particularly applicable to the motorized servo control of a clutch.

10 Claims, 1 Drawing Sheet

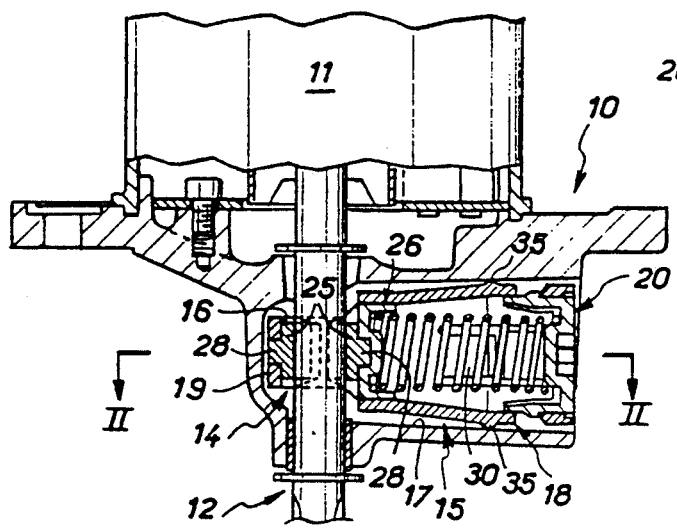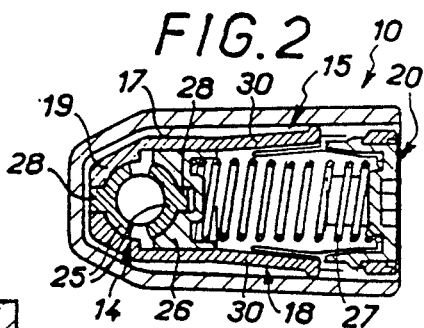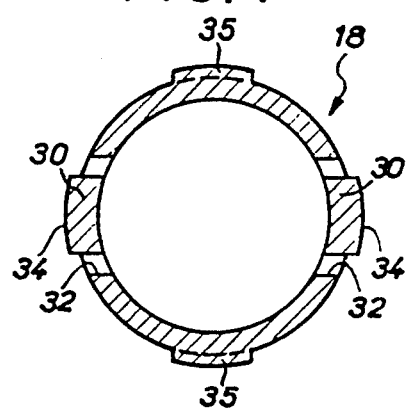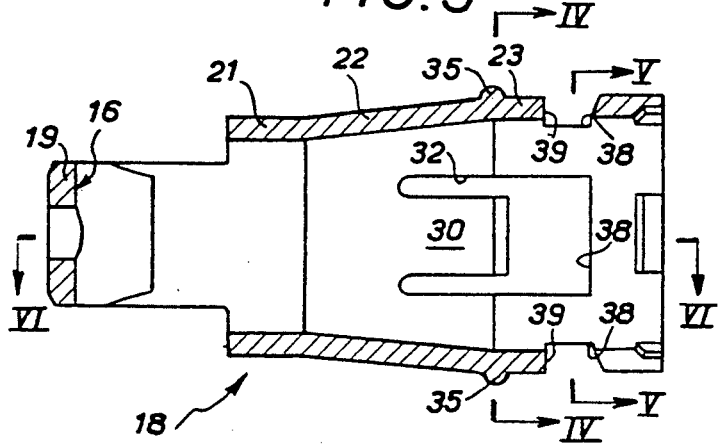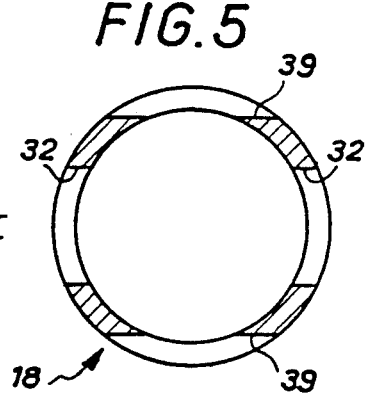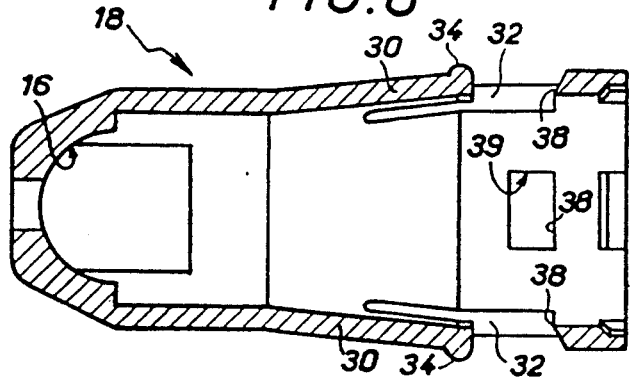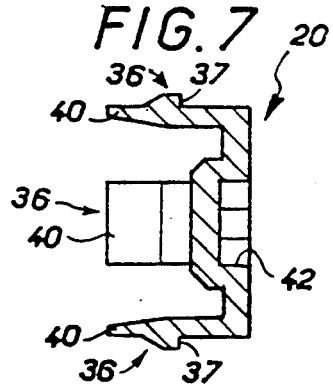

CONTROL DEVICE FOR A COUPLING MEANS SUCH AS A CLUTCH

FIELD OF THE INVENTION

This invention relates to the motorised servo control of torque coupling means which may take any form whatsoever. Thus the torque coupling means may for example be a clutch of the servo controlled type, or a speed variator or a brake. More particularly, the invention is concerned with arrangements in which a continuously acting retarding means is coupled on the output shaft of the motor of the corresponding servo control device in order to confer irreversibility on the assembly.

BACKGROUND OF THE INVENTION

Such an arrangement is for example disclosed in U.S. Pat. No. 4,750,596, in which the retarding means that is used is arranged in a housing, having an opening through which the motor output shaft extends. The housing is mounted so as to float radially in a mounting which is provided for it in a casing. The housing has an annular rib for transverse engagement on the internal surface of the mounting. This rib, being formed by local thickening of the housing wall, is rigid.

However, because of the manufacturing tolerances that are unavoidable, a certain amount of clearance inevitably exists between the housing and its mounting, which results in some scope for transverse displacement of the housing to take place within the mounting.

The motor that is used in such an arrangement in practice is a stepping motor, which accordingly operates by pulsing action. On each pulse, and due to entrainment by friction effects, the housing of the retarding means is subjected to forces tending to displace it and therefore, once the clearance has been taken up, to bring it into contact with the internal surface of its mounting. This inevitably produces undesirable noise.

SUMMARY OF THE INVENTION

An object of the invention is to provide a servo control device of the kind generally defined above which does not have this disadvantage.

According to the invention, such a control device is characterised in that resilient means are provided between the housing of the retarding means and the internal surface of its mounting.

With a view to simplifying the production process, these resilient means preferably comprise two resiliently deformable tongues, forming part of the housing and disposed in positions which are diametrically opposed to each other.

Apart from that, the resilient means, by eliminating the free play between the housing and its mounting, also systematically ensure a permanent and flexible engagement of the housing against the internal surface of the mounting, while the force exerted by the resilient means is made sufficient to enable them to oppose any noisy movement of the housing in the mounting.

In addition, all the clearance between the housing and the mounting being systematically absorbed in this way, the mounting may be formed economically by a moulding operation.

The various features and advantages of the invention will appear more clearly from the description which follows, and which is given by way of example only and with reference to the attached diagrammatic drawings.

BRIEF DESCRIPTION OF THE DRAWINGS

FIG. 1 is a partial view in axial cross sectional elevation, showing a servo control device according to the invention.

FIG. 2 is a view in transverse cross section taken on the line II—II in FIG. 1.

FIG. 3, which is on a different scale, is a view in axial cross section showing one of the components of the housing which forms part of the same control device.

FIGS. 4 and 5 are views of the same component in cross section, taken respectively on the lines IV—IV and V—V in FIG. 3.

FIG. 6 is a view in transverse cross section taken on the line VI—VI in FIG. 3.

FIG. 7, which is on the same scale as FIG. 6, is a view in transverse cross section showing the other component of the same housing.

DESCRIPTION OF PREFERRED EMBODIMENT OF THE INVENTION

As can be seen from FIG. 1, the control device according to the invention, in this example, includes in known manner a motor 11 carried by a casing 10, with the output shaft 12 of the motor acting as a drive shaft to actuate the coupling means (not shown) which is to be controlled, through a suitable transmission which is also not shown.

For further details of such a transmission, reference is directed to U.S. Pat. No. 4,750,596 mentioned above.

A continuously acting retarding means 14 is coupled on the shaft 12. The retarding means 14 is disposed within a housing 15 having an opening 16 through which the output shaft 12 extends. The casing 10 includes a mounting 17 for accommodating the housing 15, which is mounted in the mounting 17 so as to float radially in it.

The housing 15 comprises a jacket member 18 in which the opening 16 is formed, with the latter being partly delimited by an extension of the jacket member 18 in the form of a loop portion 19, and partly by a plug member 20. The plug member 20, as will be described below, is carried on the jacket member 18 at the end of the latter which is opposed to the opening 16. In this example, the wall of the jacket member 18 comprises, in succession going from the loop portion 19 to the plug member 20, three portions, namely a cylindrical portion 21, a frusto conical portion 22, and a cylindrical portion 23 of greater diameter than the cylindrical portion 21.

The retarding means 14 also includes two friction pads 25 and a thrust member 26. The friction pads 25 are arranged on either side of the shaft 12, with one of them on the same side of the latter as the loop portion 19 and the other on the opposite side. The thrust member 26 is arranged on the opposite side of the shaft 12 from the loop portion 19. Resilient means, which in this example comprise a coil spring 27, bear at one end on the thrust member 26 and at the other end on the plug member 20. The friction pads 25 are preferably identical with each other, and in this example the pad on the same side of the shaft 12 as the loop portion 19 is a separate member from the pad on the same side as the thrust member 26. Each friction pad also has a projection 28 by which it is engaged on the loop portion 19 or the thrust member 26, respectively.

In this way it is possible to make the friction pads economically compact and in a friction material having a coefficient of friction which is stable with temperature and not liable to plastic flow, while being at the same time resistant to wear.

Resilient means are provided so as to act between the housing 15 and the internal surface of the mounting 17. In this example these resilient means comprise at least one, and preferably two, tongues 30 which are resiliently deformable. The tongues 30 are arranged in positions which are diametrically opposed to each other, with respect to a plane containing the axis of the output shaft 12 which is to be retarded. They are part of the housing 15 itself, or more precisely part of its jacket member 18. More precisely, in this example the tongues 30 are arranged respectively on either side of the plane of symmetry of the assembly which contains the axis of the opening 16, and each tongue 30 extends away from the opening 16 to terminate in a respective one of two first slots 32 formed in the wall of the jacket member 18. The slots 32 are formed in the frusto conical portion 22 of the jacket portion wall, but extend into the cylindrical portion 23. Finally, each tongue 30 has a rounded bead 34 projecting from its outer surface at its free end, for transverse engagement on the internal surface of the mounting 17.

This form of construction is such that the introduction of the housing 15 into the mounting 17, which is facilitated by the fact that the internal surface of the mounting 17 is also slightly tapered, necessitates inward deflection of the tongues 30. The construction is also such that the spring force which is exerted, that is to say the force exerted by the resilient means comprising the tongue or tongues 30, to systematically ensure a permanent and flexible engagement of the housing against the internal surface of the housing. In this way, any angular displacement of the housing 15 about the axis of its opening 16, that is to say side to side swinging movement about the axis of the shaft 12, is systematically damped by resilient absorption of the energy.

In this example, and as is best seen in FIG. 4, the housing 15 has a further set of rounded beads 35, forming a cruciform pattern with the tongues 30 and projecting from the outer surface of the housing 15 for contact with the internal surface of the mounting 17. In the relaxed or unstressed condition shown in FIG. 4, the beads 35 lie radially inwardly with respect to the beads 34 of the tongues 30.

The plug member 20 of the housing 15 is engaged with a snap fit in the jacket member 18. To this end, the plug member includes lugs 36, of which in this example there are four, arranged in pairs 90 degrees apart and being resiliently deformable; and each lug 36 has a shoulder 37 which engages with a shoulder 38 of the jacket member 18. In respect of at least one of the lugs 36 (and in this example two diametrically opposed lugs 36), the shoulder 38 of the jacket member 18 comprises one of the edges, namely the one opposed to the opening 16, of the slots 32 to which the tongues 30 extend. Advantage is thus taken of these slots 32, not only for the formation of the tongues 30 but also for the snap fitting of the plug member 20 in the jacket member 18.

The shoulder 38 corresponding to the other two lugs 36 is formed on the corresponding edge of two second slots 39, which are provided specifically for this purpose in the jacket member 18 and which are bisected by a radial plane perpendicular to that which bisects the two openings. However, and as can be seen from FIG. 5, the lateral edges of the slots 39 extend parallel to the lateral edges of the slots 32, which are themselves parallel to the plane of symmetry of the assembly that is perpendicular to the axis of the opening 16.

The jacket member 18 is formed by moulding, and a single mould, divided into two half moulds moveable in opposite directions, is sufficient to obtain the simultaneous formation of the slots 32 and 39 without additional cost. Having regard to this arrangement, and to the partly cylindrical and partly frusto conical shape of the jacket member 18, its manufacture by moulding is particularly simple and economic. The same is true for the manufacture of the plug member 20.

In this example, each lug 36 of the plug member 20 has an extension portion 40 for guiding the plug member while it is being fitted to the jacket member 18. In addition, and in order to facilitate this engagement, the plug member 20 has a cruciform recess 42, of polygonal cross section, formed externally on its base. The plug member can be carried by means of this recess on a tool for turning it into the required orientation with respect to the jacket member 18.

The present invention is of course not limited to the embodiment described and shown, but embraces all possible embodiments. In particular, the resilient means acting between the housing and its mounting may be made as part of the casing 10: for example the casing 10 may be provided with tongues which extend within the mounting 17 for cooperation with the housing 15. Finally, the thrust member 26 may be formed in one piece with its associated friction pad.

What is claimed is:

1. A servo control device for a torque coupling means, said control device comprising:
   a casing defining a mounting defining an internal surface thereof;
   a housing being mounted in said mounting so as to float radially therein, the housing defining an opening therethrough and having a housing wall;
   a motor fixed with respect to said casing and having an output shaft extending through said opening;
   a continuous acting retarding means;
   means mounting the retarding means in the housing; and
   means coupling the retarding means with the motor output shaft,
   the housing comprising a jacket member which defines said opening of the housing, together with a plug member and means for mounting the plug member on said jacket member, and resilient means being operatively formed as a part on one of said housing or said mounting for biasing said housing against said mounting.

2. A servo control device according to claim 1, wherein said resilient means comprise at least one tongue, said tongue is resiliently deformable and is part of the housing.

3. A servo control device according to claim 2, wherein said resilient means comprise two of said tongues which are disposed in positions diametrically opposed to each other with reference to a plane perpendicular to said output shaft.

4. A servo control device according to claim 3, wherein the housing includes a frusto conical portion thereof, the housing wall having two first slots formed therein and intersecting said frusto conical portion, with each of said tongues extending to a respective one of said slots.

5. A servo control device according to claim 3, wherein said tongues extend away from said opening of the housing, said opening defines an axis thereof, and each of said tongues is respectively disposed on either side of a plane containing the axis of said opening.

6. A servo control device according to claim 3, wherein each of said tongues includes a rounded first bead at its end for transverse engagement on the internal surface of said mounting.

7. A servo control device according to claim 3, wherein the housing has rounded second beads, forming a cruciform pattern with said tongues and projecting from the outer surface of the housing wall, and being radially inward of first beads of said tongues in a relaxed condition.

8. A servo control device according to claim 4, wherein the means mounting said plug member in said jacket member are snap fit means comprising resiliently deformable lugs of said plug member and shoulders of said jacket member at the end of the latter opposite to said opening, for engagement of each said shoulder with a respective said lug.

9. A servo control device according to claim 8, wherein the shoulder of the jacket member corresponding to at least one of said lugs is defined by at least one of the edges of one of said first slots to which said tongues extend.

10. A servo control device according to claim 9, wherein each of the shoulders of the jacket member which are provided for said lugs of the plug member comprises at least one of the edges of a respective slot of the jacket member, and the lateral edges of said slots are parallel to a plane of the assembly which is perpendicular to the axis of said opening.

* * * * *